Oct. 22, 1935.   W. G. LAIRD   2,018,270
FLUID STORAGE SYSTEM
Filed June 15, 1931   2 Sheets-Sheet 1
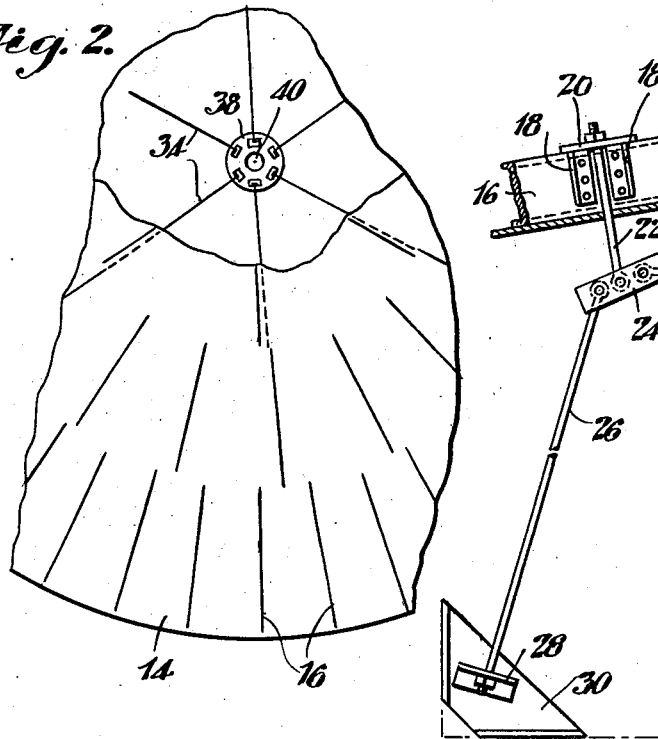
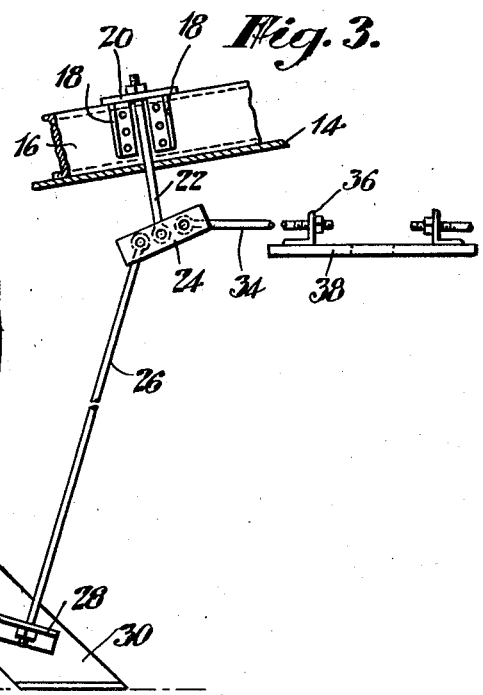
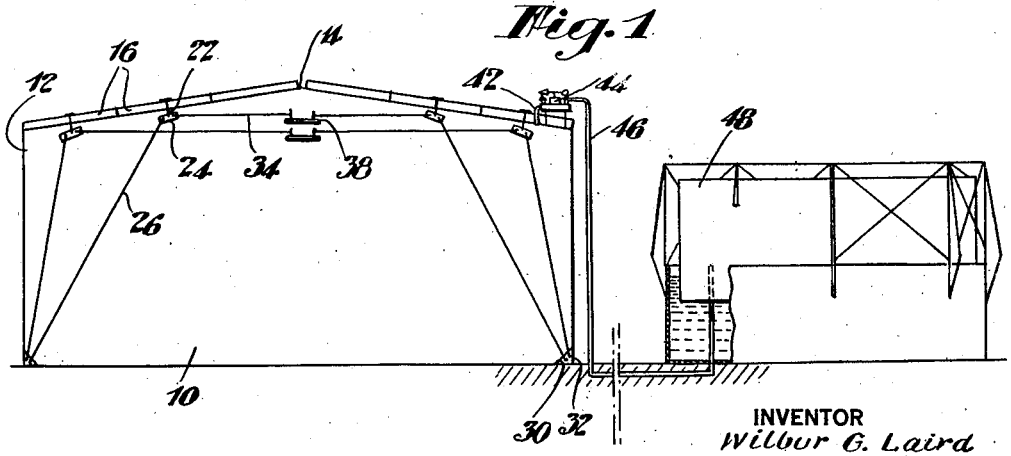
INVENTOR
Wilbur G. Laird
BY Edmund J. Borden
ATTORNEY Oct. 22, 1935.  W. G. LAIRD  2,018,270
FLUID STORAGE SYSTEM
Filed June 15, 1931  2 Sheets-Sheet 2
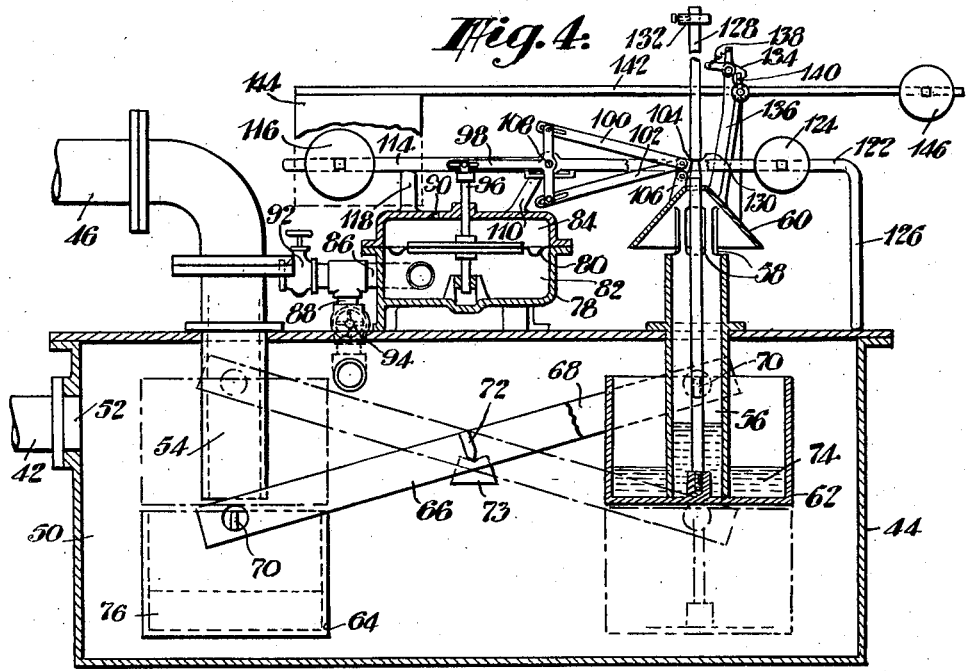
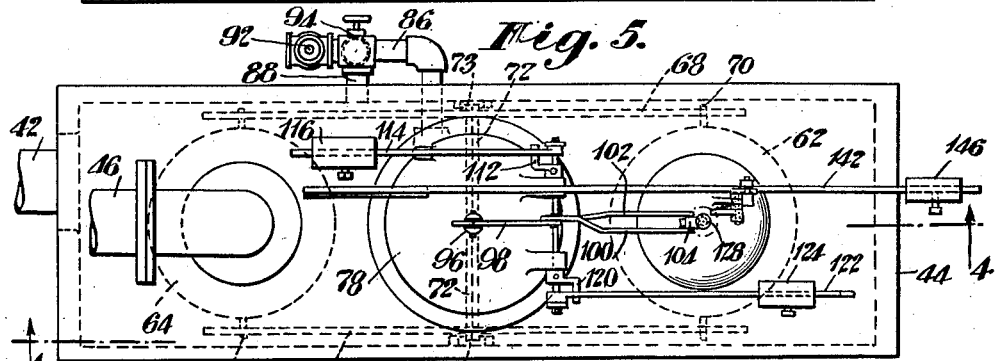
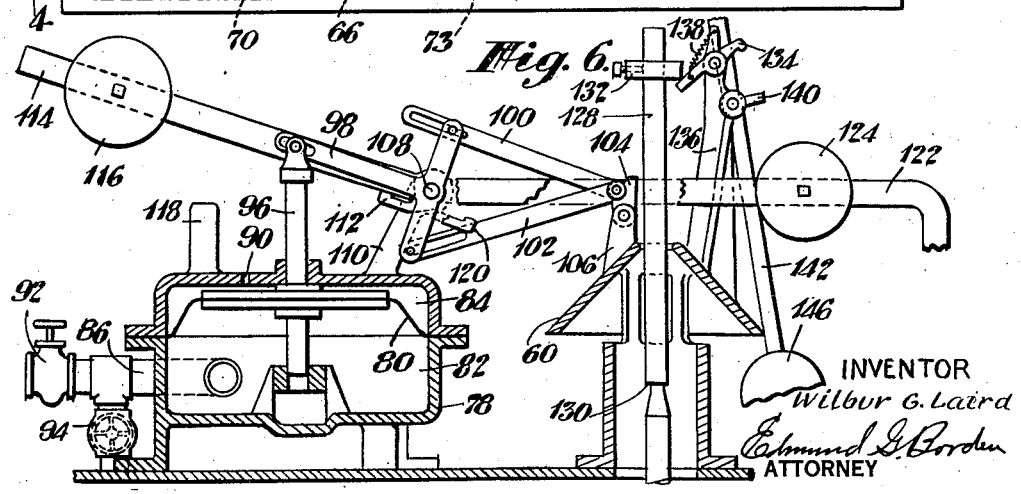
INVENTOR
Wilbur G. Laird
ATTORNEY Patented Oct. 22, 1935

2,018,270

UNITED STATES PATENT OFFICE 2,018,270

FLUID STORAGE SYSTEM

Wilbur G. Laird, Pleasantville, N. Y., assignor to Doherty Research Company, New York, N. Y., a corporation of Delaware Application June 15, 1931, Serial No. 544,484

8 Claims. (Cl. 220—1)

This invention relates to fluid storage systems, and more particularly to an improved storage system for liquids of a readily volatile or inflammable nature, which is normally sealed against vapor losses and in which a pressure obtains which is normally greater than atmospheric.

The storage of liquids of a readily volatile nature, and particularly the storage of liquid petroleum, presents a number of difficulties. When direct solar heat raises the temperature of liquid petroleum and the contents of the vapor space within a sealed storage tank, the pressure within the tank may rise rapidly due to the evolution of dissolved gases and evaporation of the volatile fractions of the oil and the expansion of the gaseous contents of the vapor space above the liquid. The pressure within an oil storage tank, thus exposed to solar evaporation and expansion, if not immediately corrected, as by releasing vapors to the atmosphere, may attain such proportions that the tank may burst. Moreover under conditions where the temperature of the surrounding atmosphere drops rapidly, the pressure within a sealed storage tank may drop below atmospheric due to the condensation and contraction of vapors and gases. In such a case the pressure within the tank may drop to the point where the walls or the roof thereof will collapse.

It has been proposed to overcome these difficulties and at the same time prevent vapor loss and reduce danger from fires as a result of admission of air into the tank, by connecting the vapor space of a sealed oil storage tank in closed circuit with a variable volume gasholder, so that the pressure within the tank may be controlled by free breathing or vapor flow between the tank and the gasholder. However it is often impracticable to provide pipes connecting the storage tank and gasholder of sufficient capacity to allow the rapid breathing which would sometimes be required to prevent development of abnormal pressures within the tank as a result of excessive rate of pumping of liquid into or from the tank or of periods of very rapid evaporation or condensation occasioned by sudden and marked changes in weather temperatures—as for example by a thunderstorm in hot summer weather.

The common type of oil storage tank in use today is constructed with a conical roof of light metal which will withstand only very low pressure differentials between the surrounding atmosphere and the inside of the tank. This type of tank roof may not always have sufficient inherent strength to withstand the pressure, amounting to several inches of water, which is imposed by a gasholder lift on a closed vapor storage system such as described in my U. S. Patent 1,794,383. The strongest section of such tanks is at their bottom curb, such curb being designed to withstand the hydrostatic pressure of the body of oil stored.

One object of the present invention is to provide a system of reinforcement for the common type of cone-roofed oil storage tank whereby a large tank may be strengthened to withstand pressure differentials up to several ounces between its interior and the outside atmosphere.

A feature of the tank reinforcement provided by the present invention is that it is simple in design and economical to install, enabling the use of previously erected cone-roofed storage tanks in a vapor conservation system such as that described in my said Patent No. 1,794,383, at a fraction of the cost that would be involved in rebuilding the roof in stronger form or in replacing such tanks with new tanks of suitable strength and storage capacity.

Another object of the present invention is to provide an improved type of safety valve adaptable to a closed liquid storage system to correct any abnormal pressures developed within the system.

Other objects and advantages of the invention will be apparent from the following detailed description, taken with the accompanying drawings, in which:

Fig. 1 is a view in diagrammatic vertical section of a liquid storage system embodying the improvements forming the subject of the present invention;

Fig. 2 is an enlarged diagrammatic top plan view of part of the roof of the oil storage tank shown in Fig. 1, parts being broken away to show the construction of underlying parts;

Fig. 3 is a detailed view illustrating one way of assembling the rods preferably used according to the present invention for reinforcing the oil storage tank;

Fig. 4 is a vertical sectional view of the preferred safety valve element of the improved oil storage system, parts being in elevation;

Fig. 5 is a top plan view of the safety valve shown in Fig. 4; and

Fig. 6 is an enlarged vertical sectional view of a portion of the valve actuating mechanism shown in Fig. 4, illustrating the operation of the mechanism due to excessive pressure within the system.

Referring to the drawings (Fig. 1), the liquid to be stored is placed in a storage tank 10 having cylindrical walls 12 and a conical roof 14 tightly sealed against the escape of gases and vapors. The roof 14 of the storage tank is reinforced by channel beams 16 which are preferably placed on top of the roof in radially extending spaced relationship and which act to maintain the roof rigid under interior tank pressures that would tend to buckle the ordinary type of unreinforced conical roof.

Attached to each channel 16 at the approximate midpoint thereof, are brackets 18 (Fig. 3) which together with the channel beam 16 support a plate 20. An adjustable eye-bolt 22 extends through the plate 20 and roof 14, and is pivotally connected to the approximate midpoint of a pivotal pin plate 24 located within the tank 10. A tension reinforcing member in the form of an eye bolt or rod 26 is pivotally connected to plate 24 and extends to a bracket 28 attached to a plate 30 located at the bottom curb 32 of the tank 10, with which the rod 26 is in adjustable engagement. From the other end of the plate 24 a pivotally connected rod 34 extends and is in adjustable engagement with a bracket 36 attached to a center plate 38. Although the tank reinforced according to the present invention may not have a central roof support, the center plate 38 may have a central opening as at 40 and may be separable so as to encircle a center post, if it is desired to apply the tank reinforcement to a storage tank which is equipped with a center roof support.

The system of reinforcement as described in connection with the tying of the roof by reinforcing members to the bottom curb of the tank, may be similarly applied to any number of a plurality of channel beams 16, each pivotal plate 24 having reinforcing rod connections extending to the bottom curb of the tank and to the centrally located plate 38 within the tank. The center plate 38 obviates the necessity of the horizontal tie rods crossing at a common point in the center of the tank.

Such a tank reinforcing system is completely adjustable by means of the nuts on the rods 22, 26 and 34. By means of these nuts the entire reinforcing system may be firmly and rapidly installed. The eye bolts 22 may be packed, or welded to the roof, at the point where they pass therethrough, to prevent leakage, and the roof may thus be permanently reinforced so as to withstand pressure differentials up to several ounces between the interior of a large tank and the outside atmosphere.

The vapor space of the storage tank 10, reinforced as above described, is connected by means of a vapor conduit 42 to a safety valve 44 suitably mounted upon the roof of the tank 10 by means of leveling brackets, and thence by means of a vapor conduit 46 to the bell of a variable volume gasholder 48 (Fig. 1). While but one oil storage tank is shown as being connected to the bell of the gasholder 48, it is obvious that a series of interconnected oil storage tanks may be connected to the gasholder 48 in a system such as described in my Patent No. 1,794,383.

The safety valve 44, the application of which according to the oil storage system of the present invention is shown in Fig. 1, is more completely illustrated in Figs. 4, 5, and 6 of the drawings.

The valve 44 comprises a gas chamber 50 having a vapor inlet 52 from pipe 42, a vapor outlet pipe 54 formed as an extension of the vapor conduit 46, and a normally closed outlet pipe 56 leading to the atmosphere through openings 58 which are situated beneath, and protected by, a frusto-conical cover 60. Within the chamber 50 is a pair of buckets 62 and 64, each having knife edge trunnions 70 on opposite sides of its rim with which the ends of beams 66 and 68 pivotally engage. The beams 66 and 68 are pivotally mounted at their midpoints upon a shaft 72 which is in turn pivotally supported by brackets 73 affixed to opposite walls of chamber 50. The buckets 62 and 64 are mounted in unbalanced weight relationship to each other. The beam end having the bucket 62 and its restraining rod is the heavier and is normally held in an elevated position in sealing relationship with the outlet pipe 56. The bucket 64 is shown in its normally depressed position, allowing free flow of vapor through the outlet pipe 54 (Fig. 5). When the bucket 62 is lowered, there is open communication between chamber 50 and the atmosphere through the pipe 56. Bodies of liquid 74 and 76, which may be water in the summer and oil in the winter, are maintained in the buckets 62 and 64, respectively, so as to act as sealing liquid when the buckets 62 and 64 are in sealing engagement with the respective pipes 56 and 54.

Above the chamber 50 is located a diaphragm chamber 78 which contains a common form of movable diaphragm 80 dividing the chamber 78 into two compartments 82 and 84. The compartment 82 communicates with the chamber 50 through a conduit 86 and 88, and the compartment 84 communicates with the atmosphere through port 90. A branch is provided from the conduit 86 and is valved at 92 to permit attaching a gauge to determine the pressure within the system. A valve is provided at 94 in conduit 88 for the purpose of closing off communication between chambers 50 and 78, should discontinuance of the operation of the safety valve be desired.

The diaphragm 80 operates the rod 96, which moves upwardly or downwardly as the pressure within the tank 10 and chamber 50 changes. The rod 96 is slidably attached to the double bell-crank 98, the T-ends of which are in turn slidably attached to the slotted ends of bars 100 and 102. The bars 100 and 102 are pivotally secured by pins to a latch 104 which is in turn pivotally connected to a bracket 106 extending upwardly from the cover 60. The double bell-crank 98 is fulcrumed by, and attached to, a shaft 108 which is journaled in brackets 110 extending upwardly from the diaphragm chamber 78.

On the shaft 108 a member 112 is mounted so as to actuate with the shaft 108 in response to movements of the diaphragm 80. Upon upward diaphragm movement the member 112 comes into contact with and raises the lever arm 114, which is loosely pivoted upon the shaft 108. A counterweight 116 is adjustably mounted on the free end of lever arm 114 to counteract the pressure under the diaphragm 80 until a pre-determined pressure is reached. The lever arm 114, under normal pressure conditions within the system, rests upon a rest bracket 118.

Similarly on another part of the shaft 108 is mounted a member 120 which actuates with the shaft 108 in response to movements of the diaphragm 80 caused by pressure changes within the system. With downward diaphragm movement, the member 120 comes into contact with and raises the lever arm 122. Lever arm 122 is loosely pivoted upon the shaft 108, and a counterweight 124 is adjustably mounted thereon, to counteract the pressure above the diaphragm 80 until a predetermined pressure is reached. The lever arm 122 may be bent at the outer or free end thereof to form a vertical extension 126 adapted to rest upon the casing of the chamber 50 under normal conditions.

Attached to the bucket 62 and extending vertically upward through the top of the frusto-conical cover 60 is a rod 128 notched at 130 and carrying at its upper end a collar 132 (Fig. 5). The latch 104 normally engages the notch 130 and maintains the rod 128 in a raised position. In this position the bucket 62 containing the body of sealing liquid 74, seals off communication between valve chamber 50 and the outer atmosphere thru pipe 56.

The valve mechanism thus described is intended merely as a safety valve, and hence under normal conditions will remain in the position illustrated in Fig. 5. However under rapid temperature changes, or for other cause, the pressure within the system may occasionally vary beyond the pressure limits for which the valve is set. When the pressure within the tank 10 increases, the pressure within the chamber 50 and in the communicating compartment 82 of the diaphragm chamber 78 will increase accordingly and tend to lift the weighted diaphragm 80. The counterweight 116 is adjustable on the lever 114 to restrain the upward movement of diaphragm 80 until a predetermined limiting pressure has been reached. When this limiting pressure is reached, the diaphragm 80 will rise and lift the arm 98 of the double bell crank which is attached to the shaft 108, and, by means of member 112, will lift the lever arm 114 and the counterweight 116. In this movement the arms 100 and 102 of the double bell crank will be actuated as shown in Fig. 6, and the latch 104 will be disengaged by means of bar 102 from the notch 130 in the rod 128, allowing the heavier bucket 62 with its retaining rod 128 to fall. As bucket 62 falls, beams 66 and 68 swing on the bearings 73 and bring the bucket 64 into sealing relationship with the pipe 54, thus sealing off this outlet pipe and simultaneously opening the chamber 50 to the outside atmosphere through the pipe 56 and the openings 58.

Similarly, when the pressure within the system decreases, the pressure within the chamber 50 and the compartment 82 of the diaphragm chamber will decrease accordingly and the diaphragm 80 will tend to fall. The counterweight 124 is adjustable on the lever arm 122 to restrain the downward movement of diaphragm 80 until a predetermined limiting negative pressure or partial vacuum is reached in the system and beneath the diaphragm 80. When the predetermined limit of partial vacuum is reached, the diaphragm 80 will fall, lowering the arm 98 of the double bell crank and thereby causing the member 120 to lift the lever arm 122 and counterweight 124. In this movement the upper arm of the double bell crank will disengage the latch 104 from the notch 130 by means of bar 100, allowing the bucket 62 to fall and effect simultaneous sealing of the pipe 54 and the opening of chamber 50 to the outside atmosphere.

When the pressure within the system varies beyond the minimum or maximum limits for which the counterweights are set, the valve mechanism operates to trip the rod 128 and in so doing brings the collar 132 into contact with a latch 134 (Fig. 6), which is pivotally mounted on a bracket 136 extending upwardly from the cover 60. The latch 134 is normally held in an approximately horizontal position (Fig. 4) by spring 138 extending from the bracket 136 to the arm 134. Normally latch 134 engages the pin 140 attached to the shaft of the counterweighted flag arm 142 which is held in an approximately horizontal position. At one end of the flag arm 142 is a flag or other symbol 144 overbalanced at the other end by a weight 146. When the collar 132 trips the latch 134, the signal arm 142 is released and swings to a vertical position so that the flag may notify the operator that the pressure on the system has exceeded the set limits, and has tripped the safety valve, cut the tank off of the system, and vented it to the atmosphere.

The safety valve is designed for manual resetting, and may be manually tripped when it is desired to disconnect an oil storage tank from the system.

The invention having been thus described, what is claimed as new is:

1. A fluid storage system comprising a normally sealed oil storage tank, a variable volume gasholder, a breather line communicably connecting the gas space at the top of said tank and said holder, and a safety valve connected in said breather line having mechanism operably responsive to variations of pressure within said system from a predetermined maximum and a predetermined minimum for simultaneously cutting off communication between said tank and said holder and breaking the seal between said tank and atmosphere.

2. In a petroleum storage system, a sealed oil storage tank having upright cylindrical walls and a conical roof, a variable volume gas holder of the movable lift type, a vapor breathing line communicably connecting the top of said tank and said holder and forming therewith a vapor breathing system, reinforcing members connecting points intermediate the peak and periphery of the roof of said tank and its bottom curb and strengthening the same against pressures impressed thereon by said holder lift, and a safety valve having a normally closed relief conduit incorporated in said breather line to compensate for any lack of breathing capacity during periods of abnormal pressure change in said system, said safety valve including mechanism responsive to abnormal pressures within said system operative to break the seal on said relief conduit and to close said breather line.

3. In a petroleum storage system, a sealed oil storage tank having upright cylindrical walls and a conical roof, a variable volume gas holder of the movable lift type, a vapor breathing line communicably connecting the top of said tank and said holder and forming therewith a vapor breathing system and reinforcing members connecting points intermediate the peak and periphery of the roof of said tank and its bottom curb and strengthening the same against pressures impressed thereon by said holder lift.

4. A reinforced liquid storage tank having cylindrical walls and a conical roof, the periphery of which is attached to the upper edges of said cylindrical walls, said roof being reinforced by a series of beams attached thereto intermediate the peak and the periphery thereof, and by tension members connecting said beams and the lower portion of said tank walls.

5. A reinforced liquid storage tank having cylindrical walls and a conical roof, reinforcing means for said roof comprising beams extending from the peak to the periphery of said roof, and tie rods extending diagonally from points intermediate the peak and periphery of the roof, to the bottom curb of said tank.

6. A reinforced liquid storage tank having cylindrical walls and a conical roof, and reinforcing for said roof comprising a series of tension rods of adjustable length extending diagonally from spaced radial points intermediate the peak and periphery of said roof to spaced points around the bottom curb of said tank.

7. A liquid storage tank having cylindrical walls and a conical roof, rigid reinforcing members attached to said roof intermediate the peak and periphery thereof, and a plurality of tension members extending from said reinforcing members to pivotal plates and from said plates to the bottom curb of said tank walls and to a plate centrally located within said tank.

8. In a petroleum storage system, a sealed oil storage tank, a variable volume gas holder, a vapor breathing line communicably connecting the top of said tank and said holder and forming therewith a vapor breathing system, a safety valve having a normally closed relief conduit incorporated in said breather line to compensate for any lack of breathing capacity during periods of abnormal pressure change in said system, said valve consisting essentially of a pair of unbalanced liquid seal bucket valves, the heavier of which is mounted in normal closing relationship with said relief conduit and the other of which bucket valves is adapted to close the normally open breathing line connecting said tank and holder, said safety valve including mechanism responsive to abnormal pressures within said system for actuating said bucket valves simultaneously to break the seal on said relief conduit and to close said breather line.

WILBUR G. LAIRD.